H. P. Curtis.
Lifting Hook, Guard &c for Stoves.
Nº 75630    Patented Mar. 17, 1868
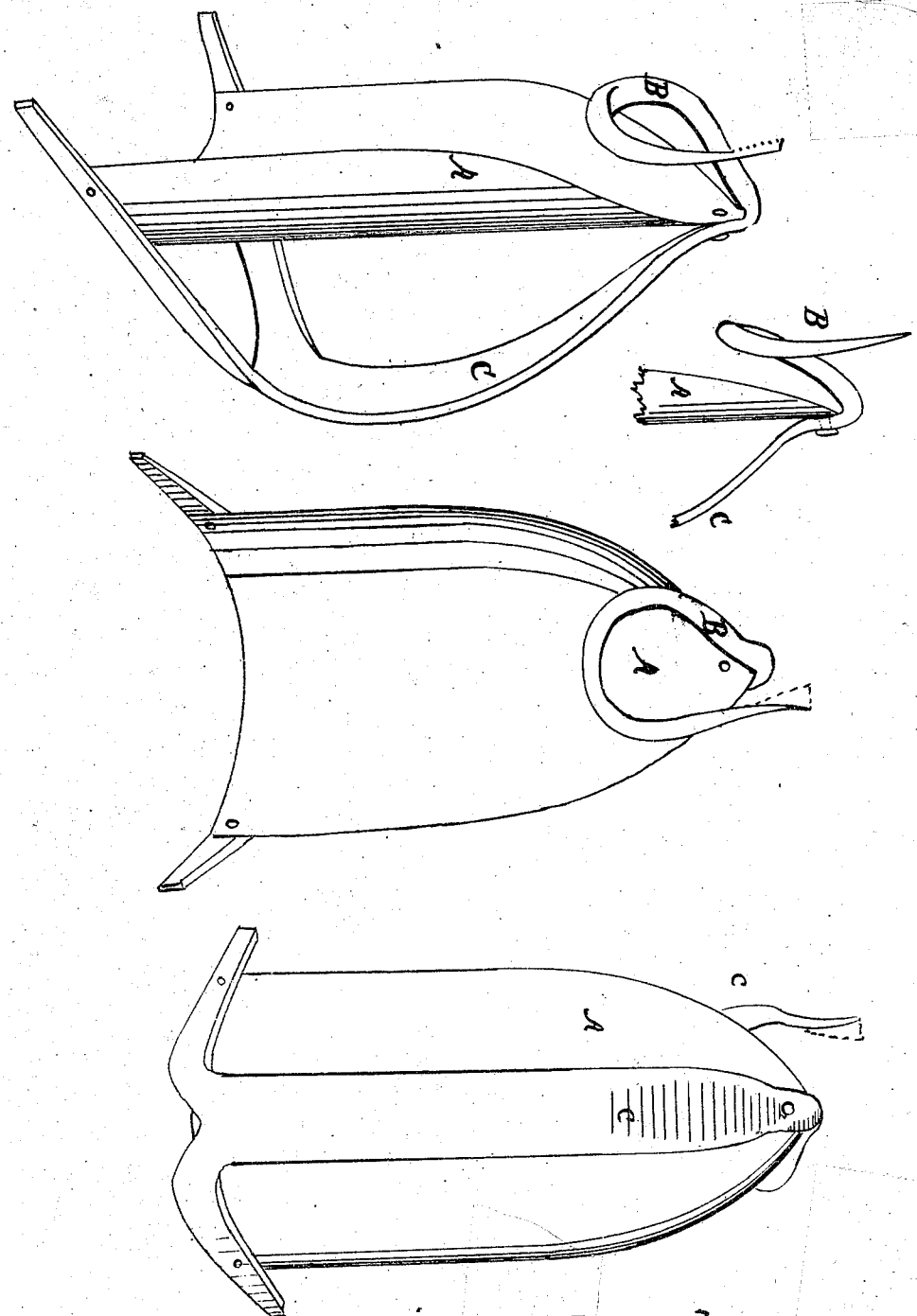
Witnesses
Thomas F. Barr
O. L. Pruden
Inventor:
H. Pelham Curtis

United States Patent Office.

H. PELHAM CURTIS, OF WASHINGTON, DISTRICT OF COLUMBIA.

Letters Patent No. 75,630, dated March 17, 1868.

IMPROVED LIFTING-HOOK, GUARD, &c., FOR STOVES.

*The Schedule referred to in these Letters Patent and making part of the same.*

TO ALL WHOM IT MAY CONCERN:

Be it known that I, H. PELHAM CURTIS, of Washington, District of Columbia, Major United States Army, have invented a new and useful Combination of Hook, Guard, and Handle for lifting on and off heated blowers and lids from Franklin and other stoves, cooking-ranges, &c., and for other similar purposes; and I do hereby declare that the following is a full and exact description thereof, reference being had to the accompanying drawings, making a part of this specification, and to the figures of reference marked thereon.

Figure 1 is a perspective view.

Figure 2, a side view of the hook and its attachment.

Figure 3, a front view, and

Figure 4 a back view of the article for which a patent is desired.

The guard or shield, as shown in figs. 1, 3, 4, may be made of iron, tin, or any other thin metal of sufficient stiffness. It supper corners are cut away to leave room between them and the hook for the admission of the blower or other handle. The handle is of suitable material, cast or wrought iron or wood, in the general form shown in drawing No. 1. The hook is attached to or near the top of the shield, and is so bent as to permit the blower or other handle to pass freely upon it. It projects somewhat above the top of the shield, that it may more readily enter the aperture of stove-lids. Its end may be broadened, as indicated by dotted lines in the drawing herewith submitted. Its plane of principal curvature is parallel, or nearly so, with that of the shield. The lower corners of the shield are provided with short legs or arms, which act as braces against the blower of the Franklin or other stove, and prevent it from swinging round against the hand.

Respecting the details of my invention, the legs, hooks, and handle may be combined in one piece, as shown in the drawings at B and C, or the legs and handle may be in one piece, as represented and designated by C, or these three parts may be made in separate pieces, and properly joined to the shield. But all such changes are mere modifications of the essential features of my invention.

The article herein described is designed to take the place of the cloth holder or bent poker, now commonly employed. It can be applied to the lifting on or off of blowers of Franklin stoves, or stoves of that general character which have a removable blower, lids of ranges and furnaces, taking out sad-irons from ovens, and many other similar domestic uses, where a holder of cloth is now generally made use of. I consider the legs attached to the lower corners of the shield as important additions to the convenient use of this invention, but not as essential parts of it.

The invention above described gives a full control over the article to be lifted and holds it securely, and at the same time amply protects the hand from injury from heat and flame, as well as from the swinging round of the hot blower, lid, or other object.

What I claim as my invention, and desire to secure by Letters Patent, is—

The combination of shield, hook, and handle, marked respectively A, B, and C, substantially in the manner and for the purposes herein described.

H. P. CURTIS.

Witnesses:
THOMAS F. BARR,
O. L. PRUDEN.